United States Patent
Carter et al.

(10) Patent No.: US 6,442,157 B1
(45) Date of Patent: Aug. 27, 2002

(54) SYSTEM AND METHOD FOR QUALITY-DRIVEN CHANNEL SELECTION IN A COMMUNICATION NETWORK

(75) Inventors: Daniel T. Carter, Plano; Regena Lee Richardson, Sachse; Jill R. Baumann, Wylie, all of TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/404,121

(22) Filed: Sep. 23, 1999

(51) Int. Cl.⁷ ............................................... H04B 7/212
(52) U.S. Cl. ....................... 370/347; 370/333; 714/774; 455/63; 455/513
(58) Field of Search ............................... 370/341, 337, 370/328, 329, 332, 333, 442, 431, 252, 347; 455/450, 451, 452, 453, 455, 62, 63, 67.3, 513; 714/704, 708, 774

(56) References Cited

U.S. PATENT DOCUMENTS

| 4,747,101 A | 5/1988 | Akaiwa et al. ................ 370/95 |
| 4,887,265 A | * 12/1989 | Felix ........................... 370/333 |
| 5,263,176 A | 11/1993 | Kojima et al. ............. 455/34.1 |
| 5,280,630 A | 1/1994 | Wang ........................ 455/56.1 |
| 5,507,008 A | 4/1996 | Kanai et al. ................ 455/34.1 |
| 5,771,454 A | 6/1998 | Ohsawa ...................... 455/452 |
| 5,812,935 A | * 9/1998 | Kay ............................ 370/333 |
| 5,926,501 A | * 7/1999 | Souissi et al. .............. 375/131 |
| 6,011,960 A | * 1/2000 | Yamada et al. ................ 455/77 |
| 6,085,106 A | * 7/2000 | Sendonaris et al. ......... 455/522 |

* cited by examiner

*Primary Examiner*—Edward F. Urban
*Assistant Examiner*—N. Mehrpour
(74) *Attorney, Agent, or Firm*—Haynes and Boone, LLP

(57) ABSTRACT

A system and method for quality-driven channel selection in a communication network that measures interference on idle and active voice channels in a first quality-driven channel selection (QCS) cell is disclosed. A voice channel queue is automatically ordered based on a clearest voice channel which is determined by a reverse bit error rate (RBER) measurement and a forward bit error rate (FBER) measurement on the active voice channels and by an idle noise measurement on the idle voice channels. Further, dynamic channel sets (DCS) are created from the voice channel queue based on the RBER, FBER, and idle noise received, where the DCS are queues that include low interference channels and moderate interference channels.

29 Claims, 3 Drawing Sheets

SYSTEM AND METHOD FOR QUALITY-DRIVEN CHANNEL SELECTION IN A COMMUNICATION NETWORK

BACKGROUND

This disclosure relates generally to wireless communication and, more particularly, to a system and method for quality-driven channel selection in a communication network.

In a wireless communication network, such as a Time Division Multiple Access (TDMA) network, wireless communication devices, such as mobile phones, are used to initiate voice calls. In order to do so, a mobile phone is provided with a radio frequency (RF) control channel to "set-up" the call between the mobile phone and the destination phone via the TDMA network. Once the set-up has been completed, the mobile phone is provided with RF voice channels that include three time slots for carrying information (voice bits) between the mobile phone and the destination phone.

It is very important to ensure that the voice channel provided to the mobile phone will be one that is of high quality. If the voice channel experiences interference as it traverses through the network, the information that the voice channel is carrying may be degraded, corrupted, or lost. Thus, it is important that a channel selection method chooses the channels with little or no interference to be utilized in the network.

There are several known channel selection methods including fixed channel assignment and dynamic channel assignment. In the fixed channel assignment method, channels are only utilized in conjunction with their respective base stations so as to not cause interference on the basis of the predictive results of propagation characteristics. In the dynamic channel assignment method, a channel is selected for every communication so as to not cause interference. Thus, channels are free to be used as long as interference is prevented thereby allowing more users to utilize the wireless communication network. For this reason, the use of the dynamic channel assignment method is increasing.

U.S. Pat. No. 5,771,454 by Ohsawa, describes a wireless communication network that utilizes a dynamic channel assignment method. In this method, base station coverage areas hierarchically overlap each other and the communication channels within these areas are used commonly by the hierarchies. When a request for communication arises, each base station performs selection from within the same hierarchy, and in this instance, a channel with which selection is to be begun is offset between the different hierarchies. Each base station controls the offset value based on a blocking occurrence value and/or a hand-over failure occurrence number of the base station so that it may be decreased in a hierarchy whose value or values mentioned are comparatively high.

U.S. Pat. No. 5,280,630 by Wang, also describes a wireless communication network that utilizes a dynamic channel assignment method. In this method, a channel allocator accesses a preferred channel list to allocate communication channels. The preferred channel list ranks channels in accordance with the occurrence of prior events on the channels, such as interrupted calls, blocked call setup requests, and calls successfully completed, ans in regards to a mean quality margin and the current channel quality.

Although a large number of users can be accommodated when a dynamic channel assignment method is utilized, complicated control schemes and apparatus arrangements are required. Additionally, interference between the base station coverage areas may occur because of the channel allocation methods used. These limitations degrade the quality and the efficiency of the system.

U.S. Pat. No. 5,507,008 by Kanai and Hamabe, describes a wireless communication network in which a channel assignment method that utilizes a carrier to interference ratio is used. Each of the base stations in the cells of the network, selects one of all speech communication channels in an order of priority common to all the cells. A base station then checks whether the carrier to interference ratio of the selected speech communication channel is equal to or higher than a predetermined level. The selected channel is assigned as a speech communication channel for the call when it is determined on the basis of the check result that the carrier to interference ratio is equal to or higher than the predetermined level. Although the carrier to interference ratio is used in determining channel selection, other important variables are not utilized. Thus, the ability of a base stations to select the highest quality channels is limited.

SUMMARY

Therefore, it is an object of the present invention to provide a system and method for quality-driven channel selection in a communication network that overcome the limitations described above. In one embodiment, the method measures interference on idle and active voice channels in a first quality-driven channel selection (QCS) cell. The method then automatically orders a voice channel queue based on a clearest voice channel (which is determined by reverse bit error rate (RBER) measurements and forward bit error rate (FBER) measurements on the active voice channels and by idle noise measurements on the idle voice channels). Dynamic channel sets (DCS) are then created from the voice channel queue based on the RBER, FBER, and idle noise received, where the DCS are queues that include low interference channels and moderate interference channels. The prioritization of the channels does not change during the call but is prioritized after the call has been completed. As such, the latest measurements are taken into account to properly prioritize the channel with the highest quality to be used for the next incoming call.

A dynamic channel assignment method is not used with the present invention thus removing the limitations described above. The present invention assists the customer in engineering the system for minimum interference, as the system automatically prioritizes channels (after frequency planning has been performed) to reduce noise on newly allocated calls and relieves the customer of having to continually monitor the channels selected to minimize interference in a changing environment. Additionally, the noise on newly allocated calls is reduced providing an increase in transmission quality.

These objects, as well as others which will become apparent, are achieved in a system that includes a plurality of wireless communication devices that communicate with a plurality of base transceiver stations (BTSs or base stations), a plurality of base station controllers (BSCs) that are coupled to the BTSs and a plurality of Mobile Switching Center's (MSCs) that are coupled to the BSCs.

DESCRIPTION OF A PREFERRED EMBODIMENT

Figure 1:
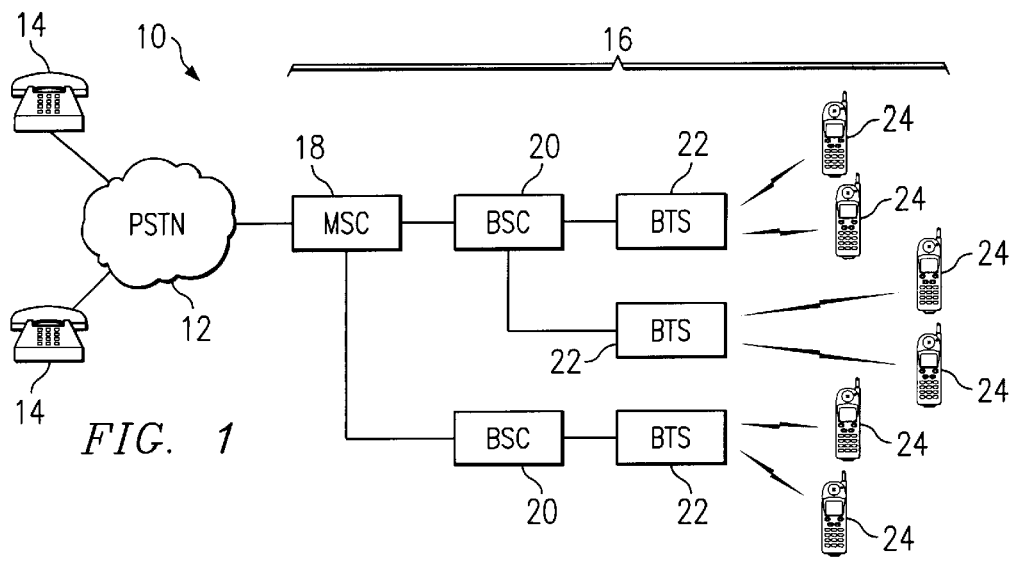
FIG. 1 is a diagrammatic view of a system for one embodiment of the present invention.

Referring to FIG. 1, the reference numeral 10 designates, in general, one embodiment of a system (a communication network) for implementing the present invention. The system 10 includes a Public Switch Telephone Network (PSTN) 12 coupled to a plurality of communication devices 14. The PSTN 12 contains the necessary equipment (hardware and software, such as DMS-MTX switches manufactured by Nortel Networks Corporation) to route calls between the communication devices 14 and other networks, such as a TDMA network 16. The TDMA network 16 includes an MSC 18 coupled to the BSC's 20, BTS's 22 coupled to the BSC's, and wireless communication devices 24 that communicate with the BTS's via a TDMA air interface. The TDMA air interface as well as the elements in the TDMA network are well known to those of skill in the art and thus will not be described further herein.

The system 10 of the present invention, utilizes a QCS that orders queues of analog voice channels (VCHs) and digital traffic channels (TCHs) to be used in processing incoming channel requests from handoffs, originations, and terminations. The primary objectives of the QCS methodology are to use channel quality indicators to prioritize channels and to assign resources for call processing from the quality-prioritized queue (list) of channels in order to maintain an acceptable voice quality. These objectives assist customers in engineering a TDMA network for minimum interference as the network automatically attempts to prioritize channels to reduce overall interference. The system also relieves the customer of having to continually monitor the channels selected to minimize interference in a changing environment.

The VCHs and TCHs are ordered based on a quality indicator (their probability for interference) involving reverse and forward noise on both idle channels and active call channels. The channel sets are ordered such that the highest quality (clearest) channels are on top of the queue and are always chosen first to service the incoming request.

Figure 2:
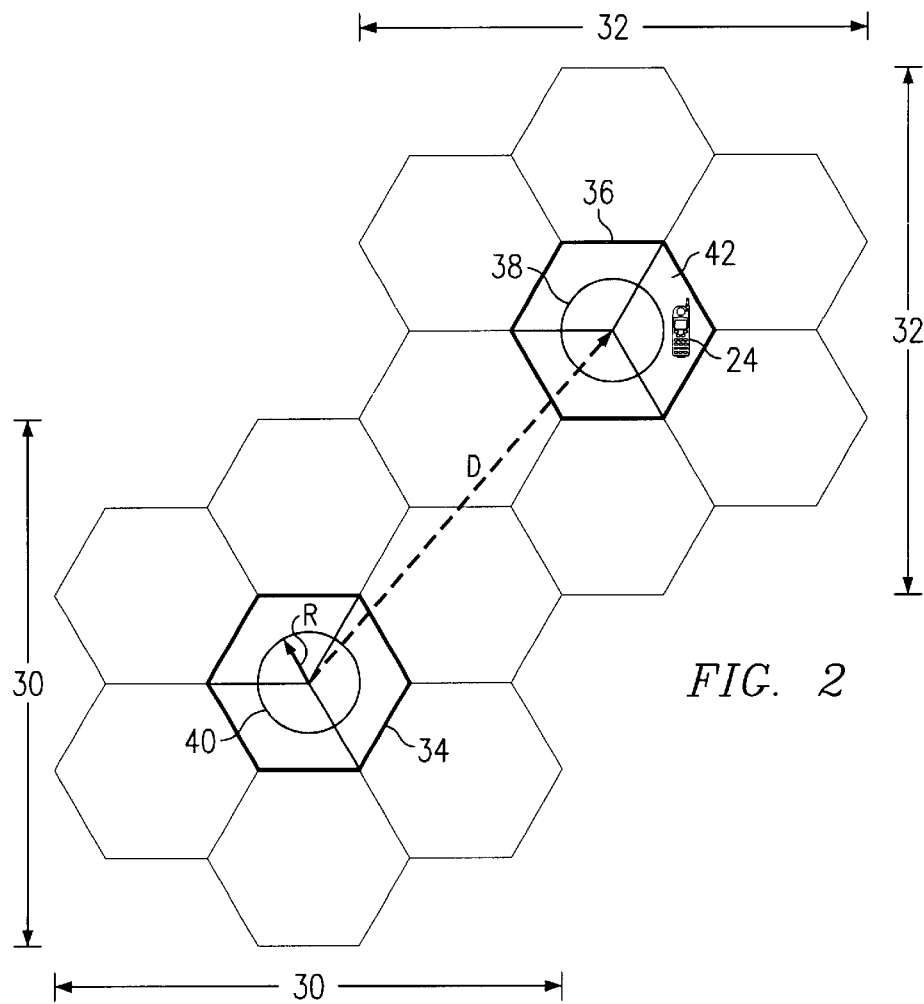
FIG. 2 is a diagrammatic view of two cell sites reusing similar frequencies of the present invention.

FIG. 2 depicts a TDMA network (such as the TDMA network 16 in FIG. 1) that includes cell clusters 30 and 32. Each cell cluster 30, 32 includes seven cell sites (known as an N=7 reuse plan). Each cell site contains at least one BTS 22 and may further contain a BSC 20 and a MSC 18. Cell sites 34 and 36 (which, for example, are tri-sectored cells) reuse the same radio frequencies to provide VCHs and TCHs to mobile phones within their coverage areas. Problems may arise, however, while reusing the same radio frequencies. Such problems include RBER and FBER on voice channels. Both RBER and FBER are indicated as a percentage of error bits per channel and are recalculated per channel after the completion of every call. The channel queue is then updated to reflect the results.

Figure 3:
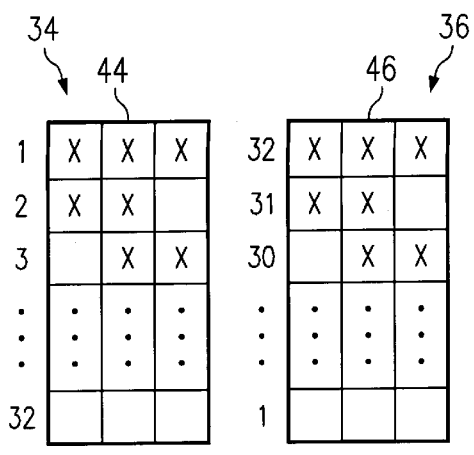
FIG. 3 is a diagrammatic view of two voice channel queues of the present invention.

Since the clearest channels are always chosen first with QCS, overall system interference is minimized. Other cells reusing the channels chosen first by this cell will sense their use, and they will automatically drop to a lower position in the queue (and thus in the selection sequence) for the second cell. This decentralized approach lessens the messaging and overhead in the system and simplifies the channel selection procedure. FIG. 3 is an example of such a situation. A queue for cell 34 is depicted by the reference numeral 44. The first (clearest) voice channel in the queue 44, is channel 1 that, for example, has all three of its timeslots filled. Since cell 36 is reusing channel 1, it is automatically dropped to a lower position in the queue 46 for cell 36. This results in a type of automatic segregation in which voice channels at the top of a cell's selection sequence will be different for each reuse cell. This assists the customers in engineering the system for minimum interference, as the system automatically prioritizes channels to reduce overall interference. The system also relieves the customer of having to continually monitor the channels selected to minimize interference.

Figure 4:
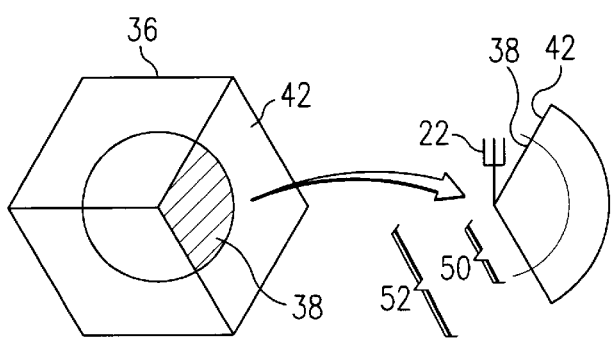
FIG. 4 is a diagrammatic view of tiering between low interference channels and moderate interference channels of the present invention.

FIG. 4 depicts a cell, such as cell 36 from FIG. 2. The rightmost sector of the inner tier 38 (which is shaded) of cell 36 is expanded to more clearly explain the concept of tiering. Tiering is typically used when trying to minimize the interference obtained on a mobile phone. By moving a channel that is experiencing RBER to the inner tier, the channel is moved further from potential mobile interferers. Referring again to FIG. 2, if the mobile phone 24 in cell 36 is interfering with the BTS in cell 34, the channel in cell 34 may be moved to the inner tier 40 to increase the distance and radius ratio (which provides lower interference because of lower power usage). Such an action decreases the probability for interference. Conversely, by moving a channel that is experiencing FBER to the outer tier, the channel is moved further from the potential BTS interferer in cell 34. If the BTS in cell 34 is interfering with the mobile phone 24 in cell 36, maintaining the mobile in the outer tier 42 assists in keeping the mobile further away from the interfering BTS. As such, overall interference in the system is minimized.

Referring again to FIG. 4, the rightmost sector utilizes a new technique known as Dynamic Channel Sets (DCS). With DCS, channels are moved into different channel queues (or sets) based on the type of noise received. The channel sets include low interference channels 52 and moderate interference channels 50. The moderate interference channels 50 service the inner tier 38 of, for example, the rightmost sector of cell 36 while the low interference channels 52 may service the entire sector of cell 36. The moderate interference channels 50 and the low interference channels 52 may similarly service the remaining sectors of the QCS cell 36.

Figure 5:
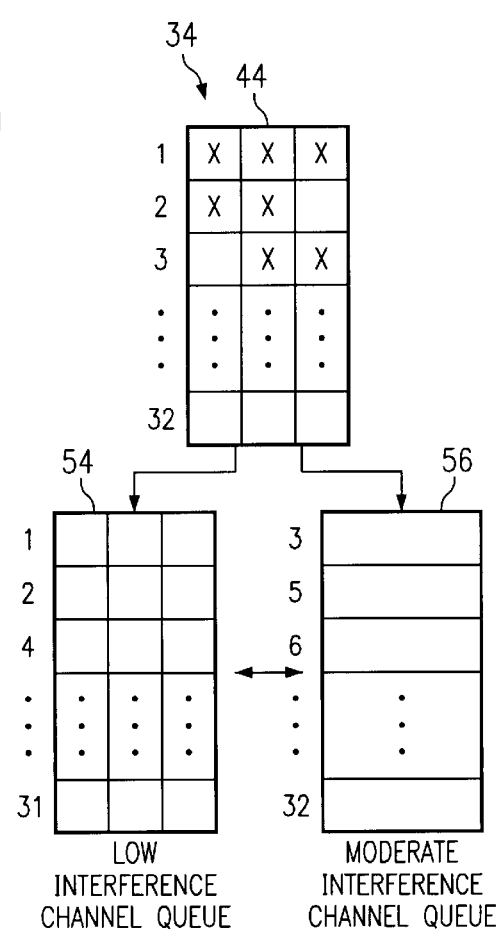
FIG. 5 is diagrammatic view of a low interference channel queue and a moderate interference channel queue of the present invention.

FIG. 5 depicts the low interference channel queue 54 and the moderate interference channel queue 56 that are created from the voice channel queue 44. The voice channel queue 44 (as well as the voice channel queue 46 in FIG. 2) initially includes low interference channels 1–32. These low interference channels 1–32 are then placed in the low interference channel queue 54 and the moderate interference channel queue 56 based on the idle and active noise received. Additionally, a channel placed in one queue (for example channel 2 in the low interference channel queue 54) may be moved to another queue (for example the moderate interference channel queue 56) if a change in the idle noise and/or the active noise is received.

In a preferred embodiment, the radio reports idle noise upon a +/−1 dB change in the RSSI measurement between the range of −90 dB and −120 dB. Since idle noise is a predictive value, only the last, most recent value, is needed. Additionally, the radio reports an average active call FBER and RBER after every call completion. In a preferred embodiment, the average of five prior active calls are used to determine the RBER and FBER values. As such, a large number of prior active calls are not used (resulting in too long a period to reflect a change) and a small number of prior active calls are not used (resulting in a channel "ping-ponging" between the low interference channel queues and the moderate interference channel queues). When a new reading is received, the oldest measurement (for the idle noise and/or the active noise) is removed and the new one is added. The channel would then be removed, if necessary, and inserted into the proper place in the queue based on the newly calculated idle noise, RBER and FBER values. As an example, the idle noise, RBER and FBER values are combined to create the following low interference channel and the moderate interference channel values:

Low Interference Channel=30% Idle Noise+20% RBER+50% FBER;

Moderate Interference Channel=30% Idle Noise+50% RBER+20% FBER.

As can be seen, the idle noise, the RBER, and the FBER are utilized when calculating the low interference channel and the moderate interference channel values. The differences in the percentages are that for tiered channel sets, FBER is the major problem with low interference channels and RBER is the major problem with moderate interference channels. If tiering is not used, the low interference channel equation is utilized because generally forward noise is deemed to cause more problems than reverse noise.

The present invention utilizes current idle noise measurements expressed in a Received Signal Strength Indicator (RSSI) value (between, for example, −30 dB and −130 dB) to rank the quality of a channel in conjunction with prior active noise call measurements expressed in FBER and RBER noise values (between, for example, 0% and 8%) to prioritize the channel.

Some of the voice channels are placed in the low interference channel queue 54 while the remaining channels are placed in the moderate interference channel queue 56. A channel cannot be in both the low interference channel queue 54 and the moderate interference channel queue 56 at the same time. Channels transition from the low interference channel queue 54 to the moderate interference channel queue 56 if the following conditions exist:

1) The average reported RBER is>a customer datafilled RBER/NOISE threshold; and
2) The average reported FBER is<a customer datafilled FBER/NOISE threshold.

For example, the customer datafilled values may be 1.5–2.0 and 0.75–1.0.

Channels transition from the moderate interference channel queue 56 to the low interference channel queue 54 if the following conditions exist:

1) The average reported FBER is>a customer datafilled FBER/NOISE threshold; and
2) The average reported RBER is<a customer datafilled RBER/NOISE threshold;

or,

1) Both the average reported RBER and FBER are<both customer datafilled BER/NOISE thresholds (the customer datafilled FBER/NOISE and RBER/NOISE thresholds).

For example, the customer datafilled values may be 0.75–1.0 and 1.5–2.0, and BER/NOISE thresholds may be between 0% and 9%.

Figure 6:
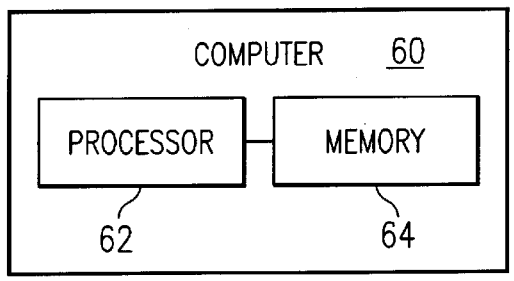
FIG. 6 is a diagrammatic view of a computer and memory of the present invention.

FIG. 6 depicts a computer 60 that comprises a processor 62 and memory 64. The computer 60 may be a personal computer or laptop, a mobile terminal, an MSC, a BSC, and a BTS, wherein the computer may be located in a first QCS cell and/or other QCS cells. Additionally, the computer 60 may be any device that can send and receive TDMA related information. The processor 62 may be a central processing unit, digital signal processor, microprocessor, microcontroller, microcomputer, and/or any device that manipulates digital information based on programming instructions. The memory 64 may be read-only memory, random access memory, flash memory and/or any device that stores digital information. The memory 64 is coupled to the processor 62 and stores programming instructions (i.e. a computer program) that, when read by the processor, cause the processor to perform certain processing operations.

Figure 7:
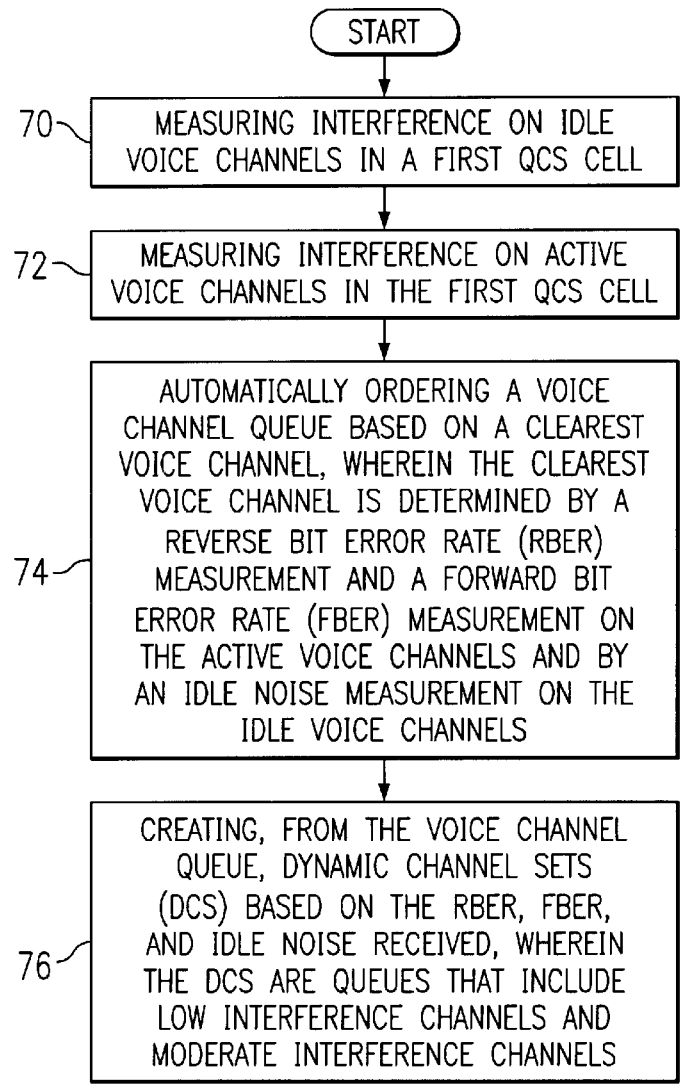
FIG. 7 is a flow chart of a method for Time Division Multiple Access quality-driven channel selection of the present invention.

FIG. 7 describes a method for TDMA QCS that may be implemented by the computer 60 of FIG. 6. The method begins at step 70 where interference is measured on idle voice channels in a first QCS cell. At step 72, interference on active voice channels is measured in the first QCS cell. The method proceeds to step 74 where a voice channel queue is automatically ordered based on a clearest voice channel, where the clearest voice channel is determined by a RBER measurement and a FBER measurement on the active voice channels and by an idle noise measurement on the idle voice channels. At step 76, dynamic channel sets (DCS) based on the RBER, FBER, and idle noise received, are created from the voice channel queue where the DCS are queues that include low interference channels and moderate interference channels.

The present invention thus enjoys several advantages. For example, dynamic channel sets with quality-driven channel selection are enhanced to transition between low interference and moderate interference channel sets based on idle noise and prior active call RBER and FBER values. As such, a greater measure of channel quality is provided. Further, the consideration of idle noise allows analog queues to be prioritized even though analog calls do not provide RBER or FBER readings.

It is understood that variations may be made in the foregoing without departing from the scope of the present invention. For example, the TDMA network, and the corresponding components, may be representative of different communication technologies. Also, the system may include additional networks (such as data networks and/or "multimedia" networks), elements (that, for example, provide radio and data services) and communication devices (such as cordless phones, computers, and "network appliances"). Additionally, different RSSI and dB values other than the +/−1 dB change in the RSSI measurement between the range of −90 dB and −120 dB may be utilized. Further, an average of more or less than three prior active calls may be used to determine the RBER and FBER values. Additionally, the percentages related to the low interference channel and the moderate interference channel values as well as the average reported RBER and FBER values may be altered. Also, the low interference channel and the moderate interference channel equations may be enhanced to differentiate between the channel's own sector and rear sectors, which would provide idle reverse and idle rear values, and thus a prediction of forward noise. Still further, the RF voice channels may include more or less than three time slots for carrying information. Additionally, the PSTN may not be needed or utilized as part of the present system as mobile to mobile calls may utilize the features of the present invention.

It is further understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method for Time Division Multiple Access (TDMA) quality-driven channel selection (QCS), the method comprising the steps of:
   measuring interference on idle voice channels in a first QCS cell;
   measuring interference on active voice channels in the first QCS cell;
   automatically ordering a voice channel queue based on a clearest voice channel, wherein the clearest voice channel is determined by a reverse bit error rate (RBER) measurement and a forward bit error rate (FBER) measurement on the active voice channels and by an idle noise measurement on the idle voice channels; and
   creating, from the voice channel queue, dynamic channel sets (DCS) based on the RBER, FBER, and idle noise received, wherein the DCS are queues that include low interference channels and moderate interference channels.

2. The method of claim 1 further comprising the step of choosing, from the voice channel queue, the clearest voice channel to service an incoming call, wherein the clearest voice channel is positioned first in the voice channel queue.

3. The method of claim 1 further comprising the step of updating the voice channel queue after the completion of every call.

4. The method of claim 1 further comprising the steps of:
   sensing, by the other QCS cells, the use of the clearest voice channel chosen by the first QCS cell if other QCS cells reuse the clearest voice channel chosen by the first cell; and
   dropping, by the other QCS cells, the clearest voice channel to a lower ordered position in voice channel queues of the other QCS cells.

5. The method of claim 1, wherein values for the low interference channels are calculated based on a percentage of the idle noise, the RBER, and the FBER.

6. The method of claim 1, wherein values for the moderate interference channels are calculated based on a percentage of the idle noise, the RBER, and the FBER.

7. The method of claim 1 further comprising the step of choosing the DCS with the highest quality first.

8. The method of claim 1 further comprising the step of transitioning from the low interference channel queue to the moderate interference channel queue if an average reported RBER is greater than a customer datafilled RBER/NOISE threshold and the average reported FBER is less than a customer datafilled FBER/NOISE threshold.

9. The method of claim 1 further comprising the step of transitioning from the moderate interference channel queue to the low interference channel queue if an average reported FBER is greater than a customer datafilled FBER/NOISE threshold and the average reported RBER is less than a customer datafilled RBER/NOISE threshold.

10. The method of claim 1 further comprising the step of transitioning from the moderate interference channel queue to the low interference channel queue if an average reported RBER and an average reported FBER are less than a customer datafilled FBER/NOISE and RBER/NOISE thresholds.

11. A system for quality-driven channel selection (QCS) in a wireless network, the system comprises:
   means for measuring interference on idle voice channels in a first QCS cell;
   means for measuring interference on active voice channels in the first QCS cell;
   means for automatically ordering a voice channel queue based on a clearest voice channel, wherein the clearest voice channel is determined by a reverse bit error rate (RBER) measurement and a forward bit error rate (FBER) measurement on the active voice channels and by an idle noise measurement on the idle voice channels; and
   means for creating, from the voice channel queue, dynamic channel sets (DCS) based on the RBER, FBER, and idle noise received, wherein the DCS are queues that include low interference channels and moderate interference channels.

12. The system of claim 11 further comprises means for choosing, from the voice channel queue, the clearest voice channel to service an incoming call, wherein the clearest voice channel is positioned first in the voice channel queue.

13. The system of claim 11 further comprises means for updating the voice channel queue after the completion of every call.

14. The system of claim 11 further comprises:
   means for sensing, by the other QCS cells, the use of the clearest voice channel chosen by the first QCS cell if other QCS cells reuse the clearest voice channel chosen by the first cell; and
   means for dropping, by the other QCS cells, the clearest voice channel to a lower ordered position in voice channel queues of the other QCS cells.

15. The system of claim 11, wherein values for the low interference channels are calculated based on a percentage of the idle noise, the RBER, and the FBER.

16. The system of claim 11, wherein values for the moderate interference channels are calculated based on a percentage of the idle noise, the RBER, and the FBER.

17. The system of claim 11 further comprises means for choosing the DCS with the highest quality first.

18. The system of claim 11 further comprises means for transitioning from the low interference channel queue to the moderate interference channel queue if an average reported RBER is greater than a customer datafilled RBER/NOISE threshold and the average reported FBER is less than a customer datafilled FBER/NOISE threshold.

19. The system of claim 11 further comprises the means for transitioning from the moderate interference channel queue to the low interference channel queue if an average reported FBER is greater than a customer datafilled FBER/NOISE threshold and the average reported RBER is less than a customer datafilled RBER/NOISE threshold.

20. The system of claim 11 further comprises means for transitioning from the moderate interference channel queue to the low interference channel queue if an average reported RBER and an average reported FBER are less than a customer datafilled FBER/NOISE and RBER/NOISE thresholds.

21. A system for Time Division Multiple Access (TDMA) quality-driven channel selection (QCS), the system comprising:

a plurality of wireless communication devices;

a plurality of base transceiver stations (BTSs), wherein the plurality of wireless communication devices communicate with the BTSs;

a plurality of base station controllers (BSCs), wherein the plurality of BTSs are coupled to the BSCs; and a plurality of mobile switching centers (MSCs), wherein the plurality of BSCs are coupled to the MSCs, and wherein at least one MSC comprises:

means for measuring interference on idle voice channels in a first QCS cell, wherein the first QCS cell includes at least one of the following elements from a group consisting of: a BTS, a BSC, and a MSC;

means for measuring interference on active voice channels in the first QCS cell;

means for automatically ordering a voice channel queue based on a clearest voice channel, wherein the clearest voice channel is determined by a reverse bit error rate (RBER) measurement and a forward bit error rate (FBER) measurement on the active voice channels and by an idle noise measurement on the idle voice channels; and means for creating, from the voice channel queue, dynamic channel sets (DCS) based on the RBER, FBER, and idle noise received, wherein the DCS are queues that include low interference channels and moderate interference channels.

22. A computer program for use in a communication network, comprising instructions for:

measuring interference on idle voice channels in a first QCS cell;

measuring interference on active voice channels in the first QCS cell;

automatically ordering a voice channel queue based on a clearest voice channel, wherein the clearest voice channel is determined by a reverse bit error rate (RBER) measurement and a forward bit error rate (FBER) measurement on the active voice channels and by an idle noise measurement on the idle voice channels; and creating, from the voice channel queue, dynamic channel sets (DCS) based on the RBER, FBER, and idle noise received, wherein the DCS are queues that include low interference channels and moderate interference channels.

23. The computer program of claim 22 further comprising instructions for choosing, from the voice channel queue, the clearest voice channel to service an incoming call, wherein the clearest voice channel is positioned first in the voice channel queue.

24. The computer program of claim 22 further comprising instructions for updating the voice channel queue after the completion of every call.

25. The computer program of claim 22 further comprising instructions for:

sensing, by the other QCS cells, the use of the clearest voice channel chosen by the first QCS cell if other QCS cells reuse the clearest voice channel chosen by the first cell; and dropping, by the other QCS cells, the clearest voice channel to a lower ordered position in voice channel queues of the other QCS cells.

26. The computer program of claim 22 further comprising instructions for choosing the DCS with the highest quality first.

27. The computer program of claim 22 further comprising instructions for transitioning from the low interference channel queue to the moderate interference channel queue if an average reported RBER is greater than a customer datafilled RBER/NOISE threshold and the average reported FBER is less than a customer datafilled FBER/NOISE threshold.

28. The computer program of claim 22 further comprising instructions for transitioning from the moderate interference channel queue to the low interference channel queue if an average reported FBER is greater than a customer datafilled FBER/NOISE threshold and the average reported RBER is less than a customer datafilled RBER/NOISE threshold.

29. The computer program of claim 22 further comprising instructions for transitioning from the moderate interference channel queue to the low interference channel queue if an average reported RBER and an average reported FBER are less than a customer datafilled FBER/NOISE and RBER/NOISE thresholds.

* * * * *